US005500314A

United States Patent [19]
Mizuguchi et al.

[11] Patent Number: 5,500,314
[45] Date of Patent: * Mar. 19, 1996

[54] MATERIAL FOR STORING INFORMATION

[75] Inventors: Jin Mizuguchi, Fribourg; Gérald Giller, Bulle, both of Switzerland

[73] Assignee: Ciba-Geigy Corporation, Tarrytown, N.Y.

[*] Notice: The portion of the term of this patent subsequent to Oct. 4, 2014, has been disclaimed.

[21] Appl. No.: 319,407

[22] Filed: Oct. 6, 1994

Related U.S. Application Data

[62] Division of Ser. No. 26,965, Mar. 5, 1993, Pat. No. 5,382,485.

[30] Foreign Application Priority Data

Mar. 11, 1992 [CH] Switzerland .................. 787/92

[51] Int. Cl.⁶ .................................................. G11B 7/24
[52] U.S. Cl. .................... 430/14; 430/17; 430/944; 430/945; 430/270.14; 430/270.2
[58] Field of Search .......................... 430/17, 495, 945, 430/944, 270, 14; 369/284, 288

[56] References Cited

U.S. PATENT DOCUMENTS

| | | | |
|---|---|---|---|
| 4,632,893 | 12/1986 | Rochat et al. | 430/58 |
| 4,707,425 | 11/1987 | Sasagawa et al. | 430/21 |
| 4,760,004 | 7/1988 | Rochat et al. | 430/58 |
| 4,946,762 | 11/1990 | Albert et al. | 430/270 |
| 5,144,333 | 9/1992 | Mizuguchi et al. | 346/1.1 |
| 5,352,551 | 10/1994 | Mizuguchi et al. | 430/17 |

FOREIGN PATENT DOCUMENTS

| | | |
|---|---|---|
| 337209 | 10/1989 | European Pat. Off. . |
| 401791 | 12/1990 | European Pat. Off. . |
| 490817 | 6/1992 | European Pat. Off. . |

OTHER PUBLICATIONS

Emmelius et al. Agewandte Chemie vol. 11 pp. 1475–1502 (1989).

Mizuguchi et al. J. Imaging Sci. vol. 32 No. 3 pp. 135–140 (May 1988).

Primary Examiner—Charles L. Bowers, Jr.
Assistant Examiner—John A. McPherson
Attorney, Agent, or Firm—Michele A. Kovaleski

[57] ABSTRACT

A process for the optical recording and storage of information in the form of bits by irradiating a recording material comprising a substrate coated with at least one layer of a pigment selected from the group of the dithiopyrrolopyrroles, dithioquinacridones, phthalocyanines or mixtures of several of these pigments as recording layer dotwise or linearly with laser light in the near infrared range (NIR range), which pigment (a) has a crystal modification having an absorption band in the NIR range, and (b) is in contact with a solid organic compound that changes the crystal modification of the pigment upon irradiation with laser light, so that (c) after irradiation the absorption in the NIR range is reduced, while the organic compound exhibits no absorption in the NIR range before and after irradiation.

18 Claims, No Drawings

MATERIAL FOR STORING INFORMATION

This is a divisional of Ser. No. 08/026,965, filed Mar. 5, 1993, now U.S. Pat. No. 5,382,485.

The present invention relates to a process for the optical recording and storage of information in the form of bits by irradiating a recording material comprising a substrate coated with at least one layer of a pigment selected from the group of the dithiopyrrolopyrroles, dithioquinacridones, phthalocyanines or mixtures of two or more of these pigments as recording layer dotwise or linearly with laser light in the near infrared range (NIR range), which pigment (a) has a crystal modification having an absorption band in the NIR range, and (b) is in contact with a solid organic compound that changes the crystal modification of the pigment upon irradiation with laser light, so that (c) after irradiation the absorption in the NIR range is reduced, while the organic compound exhibits no absorption in the NIR range before and after irradiation.

The use of dyes that absorb in the near infra-red range (NIR) for recording information in WORM (write once read many) systems has been known for some time and is described, inter alia, by M. Emmelius in Angewandte Chemie, No. 11, pp. 1475–1502 (1989). By irradiating such recording materials with laser light it is possible to effect the shift in absorption necessary for recording information in the form of bits by physical changes (e.g. by sublimation or diffusion) or by chemical changes (e.g. photochromism, isomerisation or thermal decomposition). Systems containing organic pigments which, when irradiated with laser light, undergo a direct phase change (change in the arrangement of the molecules) and an associated increase in transmission or reflectivity when reading out information (reduction of absorption) are not yet known in the art.

In U.S. Pat. No. 4,632,893 there are disclosed layer materials comprising a layer of a dithiopyrrolopyrrole on a metallic and electrically conductive and opaque substrater and a further layer of a hydrazone thereon. In these materials, the dithiopyrrolopyrrole is in the form of a modification that has an absorption band in the NIR range. These layer systems are suitable for use as photoreceptors for producing latent images by selectively reducing charges with laser light after an integral charge. The latent image can then be converted by known reprographic methods into a visible image. U.S. Pat. No. 4,760,004 describes similar layer materials having a layer of a dithioquinacridone.

In EP-A-0 401 791 it is disclosed that dithiopyrrolopyrroles treated locally with a solvent exhibit changes in absorption caused by phase changes which are associated with the formation of an absorption band in the NIR range. The phase change causes the NIR absorption to increase substantially They are therefore suitable for recording and storing information by recording in the form of bits (corresponds to the local treatment) with an ink-jet printer. Reading out information can be effected in the NIR range by measuring the increased absorption.

It is also known that the phase of dithiopyrrolopyrroles and dithioquinacridones exhibiting high absorption in the NIP, range is very stable to the action of heat and light-induced radiation. It has thus so far not been possible to use these pigments for optical storage by changing the phase such that, after irradiation, the NIR absorption is lower.

It has now been found that pigments from the group of the dithiopyrrolopyrroles, dithioquinacridones and phthalocyanines in that crystal modification which exhibits a high light absorption in the NIR range undergo direct a phase change by irradiation with laser light in the NIR range (for example with a diode laser) when they are in contact with a solid organic compound. The phase change leads to a reduction in the NIR light absorption. Substrates coated with these pigments and which may be in contact with a solid organic compound and do not absorb in the NIP, range even before and after irradiation are therefore eminently suitable for use as materials for recording, storing and reproducing information (WORM systems) and, in contrast to known systems, the change in the NIR light absorption is from strong to weak.

In one of its aspects the invention relates to a process for the optical recording and storage of information in the form of bits by irradiating a recording material comprising a substrate coated with at least one layer of a pigment selected from the group of the dithiopyrrolopyrroles, dithioquinacridones, phthalocyanines or mixtures of several of these pigments as recording layer dotwise or linearly with laser light in the NIR range, which pigment (a) has a crystal modification having an absorption band in the NIR range, and (b) is in contact with a solid organic compound that changes the crystal modification of the pigment upon irradiation with laser light, so that (c) after irradiation the absorption in the NIR range is reduced, while the organic compound exhibits no absorption in the NIR range before and after irradiation.

In another of its aspects the invention relates to a material on which information is written, the recording layer of which material comprises a substrate coated with at least one layer of a pigment selected from the group of the dithiopyrrolopyrroles, dithioquinacridones, phthalocyanines or mixtures of several of these pigments, which pigment has an absorption band in the NIR range and is in contact with a solid organic compound that changes the crystal modification of the pigment upon irradiation with laser light and even before and after irradiation exhibits no absorption in the NIR range, and said recording layer contains the written information in the form of bits which, compared with the unchanged environment, have a greater reflectivity and reduced absorption in the NIR range.

In yet another of its aspects the invention relates to a material for optical recording and storing information comprising a transparent and dielectric substrate coated with at least one layer of a pigment selected from the group of the dithiopyrrolopyrroles, dithioquinacridones, phthalocyanines or mixtures of two or more of these pigments, which pigment exhibits an absorption band in the NIR range and is in contact with a solid organic compound that changes the crystal modification of the pigment upon irradiation with laser light and even before and after irradiation exhibits no absorption in the NIR range.

The following pigments are suitable for use as organic recording material: dithioquinacridones, oxophthalocyanines, metal phthalocyanines and, preferably, dithioketopyrrolopyrroles.

Exemplary of dithioketopyrrolopyrroles are 1,4-dithioketo- 3,6-diphenylpyrrolopyrrole (q.v. inter alia U.S. Pat. No. 4,632,893). Preferred 1,4-dithioketo-3,6-diphenylpyrrolo[3,4-c]-pyrroles have the formula I,

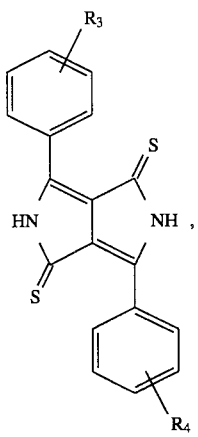

wherein $R_3$ and $R_4$ are each independently of the other —H, —Cl, —CH$_3$, —OCH$_3$, —N(CH$_3$)$_2$, —SC$_6$H$_5$ or —S-alkyl of 1 to 12 carbon atoms. C$_1$–C$_{12}$Alkyl is is typically methyl, ethyl, n-propyl, n-hexyl, n-decyl and, preferably n-dodecyl.

In the practice of this invention, the compound of formula I (hereinafter abbreviated to DTPP), wherein $R_3$ and $R_4$ are preferably H, is especially preferred.

Dithioquinacridones are disclosed in U.S. Pat. No. 4,760,004. These compounds may be of formula II or III or they may also be in the form of mixtures.

Suitable dithioquinacridones are typically compounds of formulae (II) and (III)

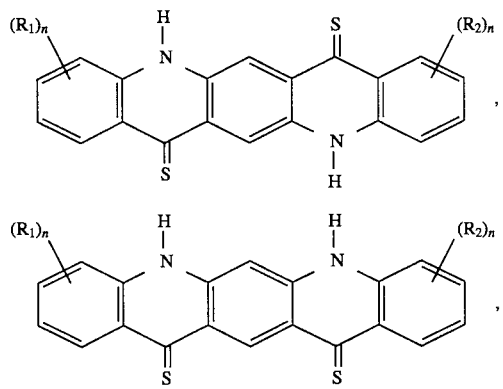

wherein $R_1$ and $R_2$ are H, F, Cl, Br, C$_1$–C$_{18}$alkyl or C$_1$–C$_3$alkoxy, and n is 0 or 1, 2 or 3.

$R_1$ and $R_2$ as alkyl may be linear or branched and alkyl preferably contains 1 to 12, more particularly 1 to 6 and, most preferably 1 to 3, carbon atoms. Typical examples are methyl, ethyl, n- and isopropyl, n-, iso- and tert-butyl, pentyl, hexyl, octyl, nonyl, decyl, dodecyl, tetradecyl and octadecyl. Methyl and ethyl are particularly preferred. $R_1$ and $R_2$ as alkoxy are typically methoxy, ethoxy and n- and isopropoxy. In formulae II and III, n is preferably 0, 1 or 2 and is most preferably 0 or 1. In a preferred embodiment of the invention, the quinacridones are those of formulae II and III, wherein $R_1$ and $R_2$ are —H, —F, —Cl, —Br, —CH$_3$ or CH$_3$O—, and n is 0 or 1. Quinacridones of formula II and III, wherein $R_1$ and $R_2$ are —H, are especially preferred.

Suitable phthalocyanines are typically oxophthalocyanines such as titanyl and vanadyl phthalocyanine, and metal phthalocyanines such as indium, chloroindium, aluminium, magnesium and lead phthalocyanine.

Mixtures of dithiopyrrolopyrroles of the above structures, mixtures of dithioquinacridones or phthalocyanines, as well as mixtures of these pigment classes, can also be used.

In the recording material of this invention a further layer of a solid organic compound having the properties discussed above is provided between the substrate which may be coated with a reflective layer and the layer of pigments and/or on said layer.

Solid organic compounds suitable for use in the process of this invention preferably have a melting point above 90° C. These compounds include ketones, typically benzil, benzoin, anthrone, dimedone, 4,4'-dimethoxybenzil, fluoren-9-one, 1,3-indandione or tetraphenyl-2,4-cyclopentadien-1-one; ketones of the phenone type, including 4-acetamidoacetophenone, 3-aminoacetophenone, 4-aminoacetophenone, 2-aminobenzophenone, 4-aminobenzophenone, 2-amino-5-chlorobenzophenone, 4-aminopropiophenone, 2,4-dihydroxybenzophenone, 4,4'-dihydroxybenzophenone, 4,4'-dimethoxybenzophenone, 4-hydroxybenzophenone, 4-hydroxypropionphenone or 4-phenylacetophenone; aldehydes such as 4-acetamidobenzaldehyde, 3,4-dihydroxybenzaidehyde, 3,5-dimethoxy-4-hydroxybenzaldehyde, 4-(dimethylamino)cinnamaldehyde or 4-hydroxybenzaldehyde; heterocycles such as 2-thiazoline-2-thiol, N-thiazol-2-ylsulfanilamide, 2-acetylpyrrole, 2-aminobenzothiazole, coumarin, 2,2-dimethyl-1,3-dioxan-4,6-dione, hydantoin, 4-hydroxycoumarin, 7-hydroxycoumafin, hydroxy-2-methylpyranone, isatin, 2-aminobenzothiazole, 2-mercaptobenzothiazole, 2-mercaptobenzoxazole, 2-methylbenzimidazole, 2-methylimidazole, 3-methylindole, 3-methyl-1-phenyl-2-pyrazolin-5-one, oxindole, phenothiazine, 2-phenylimidazole, 4-phenylurazole, phthalazone, tetrahydrofuran-2,4-dione, 1,1'-thiocarbonyldiimidazole,thioxothiazolidin- 4-one, xanthone, thianthrene, 4-aminoantipyrine or (4S,5R)-(+)-1,5-dimethyl- 4-phenylimidazolin-2-one; amides and hydrazides such as 2-aminobenzamide, 4-aminobenzamide, 3-aminocrotonamide, 2-aminocyanoacetamide, benzamide, cyanoacetamide, 2-ethoxybenzamide, nicotinamide, thioacetamide, thiobenzamide, acetyl 2-phenylhydrazide or oxalyl bis(cyclohexylidene hydrazide); anilides such as acetanilide, 4-aminoacetanilide, benzanilide or 4-methylacetanilide; imides as N-hydroxy-5-norbornene- 2,3-dicarboximide, N-hydroxyphthalimide, N-hydroxysuccinimide, maleimide, malonimide or 1,2,3,6-tetrahydrophthalimide; carboxylic acids such as 2-acetylbenzoic acid, acetylsalicylic acid, adipic acid, D-(+)-malic acid, 4-aminobutyric acid, 2-amino-5-chlorobenzoic acid, 4-aminohippuric acid, 6-aminohexanoic acid, 3-benzoylpropionic acid, dehydracetic acid, L(+)-dehydroascorbic acid, hippuric acid, 2-iodohippuric acid, DL-mendelic acid, R-(–)-mandelic acid, mercaptosuccinic acid, 3-oxoglutaric acid, (S)-(–)-N-(1-phenylethyl)phthalamidic acid or malonic acid; quinones, including acenapthenequinone, anthraquinone, 2,3-dichloro-5,6-dicyano-p-benzoquinone, 1,4-dihydroxyanthraquinone, 2-ethylanthraquinone, 1,4-naphthoquinone, 9,10-phenanthrenequinone, tetramethyl-p-benzoquinone or menadione; ureas, including N,N-dimethylurea, urea, N-methylurea, N-phenylurea, 4-phenylsemicarbazide or 1-phenylsemicarbazide; thioureas such as N-acetylthiourea, thiourea, N-phenylthiourea, thiocarbohydrazide, thiobiuret, 1-phenylthiosemicarbazide, 4-phenylthiosemicarbazide or thiosemicarbazide; anhydrides, including succinic anhydride, 3-nitrophthalic anhydride, phthalic anhydride, 1,2,3, 6-tetrahydrophthalic anhydride or Epiclon® B-4400 (Dainippon); sulfones such as 2,3-dihydro-1,2-benzisothiazol-3-one-1,1-dioxide, 4,6-diphenylthieno( 3,4-d)-1,3-dioxol-2-one-5,5-dioxide or diphenyl sulfone; sulfoxides such as dibenzyl sulfoxide or diphenyl sulfoxide; carboxylates such as diethyl acetamidomalonate, dimethyl-2-aminoterephthalate, ethyl (acetamidocyanoacetate), ethyl (2-amino-4-thiozolyl)glyoxylate, ethyl oxamate or dimethyl fumarate; aromatic hydrocarbons, including 1,1-H-benzo(a)fluorene, 1,1-H-benz(b)fluorene, anthracene, 2-nitrofluorene or [2,2]-paracyclophane; as well as further suitable polyfunctional compounds such as N-acetyl-L-cystein, N-actylglycine, acetylmethylene triphenylphosphoran, 1,3-cyclohexadione, 1,3-cyclopentadione, desoxy-4-anisoine, 2,3-diphenyl-2-cyclopropen-1-one, 1,5-diphenylcarbazone, 9-fluroenylmethylsuccinimidyl carbonate, L-(+)-gulonyl-γ-lactone, N-hippuryl-L-arginine, N-hippuryl-L-phenylalanine, N-acetyl-L-cystein, N-acetylglycine, 2-methyl-1,3-cyclohexandione or 2-methyl-1,3-cyclopentanedione.

Further suitable solid organic compounds axe hydrazones, said hydrazones preferably containing an aromatic group at a nitrogen atom.

The hydrazones preferably contain 6 to 40 and, most preferably, 10 to 30, carbon atoms. They am characterised by the structural unit —CH=N—N=. The hydrazones may have the formula IV

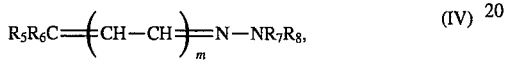

(IV)

wherein $R_5$ is H, $C_1$–$C_6$alkyl or phenyl which is unsubstituted or substituted by F, Cl, Br, $C_1$–$C_6$alkyl, $C_1$–$C_6$alkoxy, di($C_1$–$C_6$alkyl)amino, diphenylamino, dibenzylamino, phenylbenzylamino, ($C_1$–$C_6$alkyl)phenylamino or ($C_1$–$C_6$alkyl)benzylamino, $R_6$ is phenyl, naphthyl, anthryl, styryl, pyridyl, furyl or thiophenyl which are unsubstituted or substituted by F, Cl, Br, $C_1$–$C_6$alkyl, $C_1$–$C_6$alkoxy, di($C_1$–$C_6$alkyl)amino, diphenyllamino, dibenzylamino, phenylbenzylamino, ($C_1$–$C_6$alkyl)phenylamino or ($C_1$–$C_6$alkyl)benzylamino, or $R_5$ is H and $R_6$ is a carbazole radical of formula

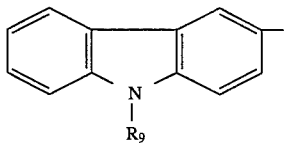

which is unsubstituted or substituted by F, Cl, Br, $C_1$–$C_6$alkyl, $C_1$–$C_6$alkoxy or di($C_1$–$C_6$alkyl)amino, and $R_9$ is $C_1$–$C_6$alkyl, $R_7$ and $R_8$ am each independently of the other $C_1$–$C_6$alkyl, phenyl, naphthyl or benzyl, or phenyl, naphthyl or benzyl which are each substituted by F, Cl, Br, $C_1$–$C_6$alkyl, $C_1$–$C_6$alkoxy or di($C_1$–$C_6$alkyl)amino, and n is 0 or 1.

In formula IV n is preferably 0. $R_5$, $R_6$, $R_7$, $R_8$, $R_9$ and substituents as alkyl may be linear or branched and contain preferably 1 to 4 carbon atoms, most preferably 1 or 2 carbon atoms. Typical examples are methyl, ethyl, n- and isopropyl, n-, iso- and tert-butyl, pentyl and hexyl. Methyl and ethyl am preferred.

The alkoxy substituent preferably contains 1 to 4 carbon atoms and may be linear or branched. Typical examples are methoxy, ethoxy, n- and isopropoxy, n-, iso- and tert-butoxy, pentoxy and hexoxy. Methoxy and ethoxy are preferred.

Typical examples of alkylamino substituents are dimethylamnio, diethylamino, methylethylamino, di-n-propylamino or diisopropylamino, di-n-butylamino, n-propylmethylamino, n-butylmethylamino, n-propylethylamino, n-butylethylamino, methylphenylamino, ethylphenylamino, methylbenzylamino and ethylbenzylamino.

Further suitable solid organic compounds are pigments or pigment-type compounds, for example unsubstituted or substituted pyrrolopyrroles or quinacridones. The pyrrolopyrroles may have the formula V,

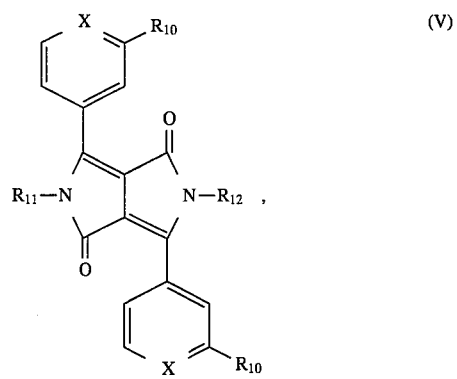

wherein the X substituents are each independently of the other CH, CCl or N, $R_{10}$ is H or Cl, and $R_{11}$ and $R_{12}$ are each independently of the other H or $CH_3$. Such compounds are disclosed, inter alia, in U.S. Pat. No. 4,579,949 and in U.S. Pat. No. 4,585,878. Representative examples of such compounds are: 1,4-diketo-3,6-diphenylpyrrolo[3,4-c]pyrrole, 1,4-diketo-3,6-bis( 4-chlorophenyl)pyrrolo[ 3,4-c]pyrrole, 1,4-diketo-3,6-bis(3-chlorophenyl)pyrrolo[3,4-c]-pyrrole, 1,4-diketo-3,6-bis(4'-pyridyl)pyrrolo[3,4-c]pyrrole, 1,4-diketo-2,5-dimethyl- 3,6-diphenylpyrrolo[3,4-c]pyrrole and 1,4-diketo-2-methyl-3-(4-chlorophenyl)-6-phenylpyrrolo[ 3,4-c]pyrrole.

The quinacridones may have the formula VI

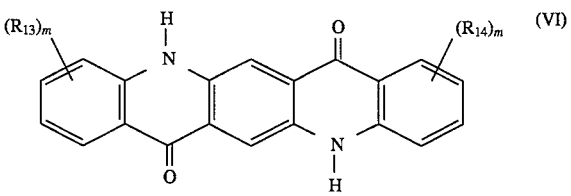

wherein $R_{13}$ and $R_{14}$ are each independently of the other H, F, Cl, Br or $C_1$–$C_3$alkoxy and m is 1, 2 or 3. Such quinacridones are described by E. E. Jaffe in the Journal of the Oil and Colour Chemists' Association 1, pages 24 to 31 (1992).

Preferred solid organic compounds are benzil, 4-aminobenzophenone, 3,4-dihydroxybenzaldehyde, 2-methylbenzimidazole, malonic acid, acenaphthenquinone, N-phenylurea, thiourea, 4-methylacetanilide, diphenyl sulfone, dibenzyl sulfoxide, anthracene, saccharine or the above mentioned 1,4-diketopyrrolopyrroles, quinacridones and hydrazones. Preferred hydrazones are those of formulae

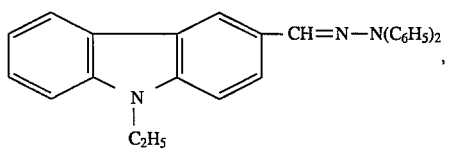

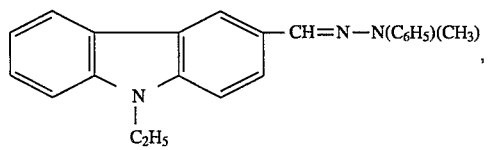

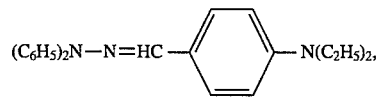

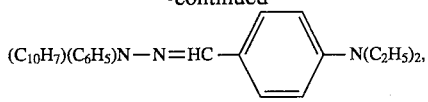

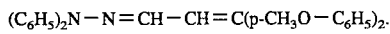

Particularly preferred solid organic compounds are malonic acid, N-phenylurea, an organic hydrazone, dipyrrolopyrrole and, most particularly, dibenzyl sulfoxide (DBS).

A preferred embodiment of the invention is a recording material in which the pigment is DTPP or a dithioquinacridone and the solid organic compound is a hydrazone.

The solid organic compounds are characterised by two properties: (a) no absorption in the NIR range and (b) interaction with the pigment of the recording layer and the conversion thereof into a phase without or with only minor NIR absorption. Such compounds can be readily determined by the skilled person by measurement.

Suitable substrates are typically metals, alloys, glass, minerals, ceramics and thermoset or thermoplastic materials. The substrate may have a thickness of 0.01 mm to 1 cm, preferably of 0.1 mm to 0.5 cm. Preferred substrates are glass and homopolyeric or copolymeric plastics materials. Suitable plastics materials include thermoplastic polycarbonates, polyamides, polyesters, polyacrylates and polymethacrylates, polyurethanes, polyolefins, polyvinyl chloride, polyvinylidene fluoride, polyimides, thermoset polyesters and epoxy resins.

Substrates can be prepared by the mixing and shaping methods customarily used for thermosetting and thermoplastic materials, typically casting, moulding, injection moulding and extrusion methods.

The substrate may be provided with one or more than one layer of pigments, typically with 1 to 10, preferably 1 to 5 and, most preferably, 1 to 3, layers. The number of layers and further layers will depend mainly on the desired optical density of the layer arrangement, which must ensure a sufficient absorption at the wavelength used for recording.

The thickness of the layer of pigments is typically 100 to 3000 Å, preferably 100 to 2000 Å and, most preferably, 200 to 1000 Å.

The layer of pigments or the substrate can be coated with a reflective layer which has a thickness of typically 100 to 5000 Å, preferably 100 to 3000 Å and, most preferably, 300 to 1000 Å. Particularly suitable reflective materials are metals which reflect the laser light used for recording and reproduction well, for example the metals of the third, fourth and fifth main groups and the subgroups of the Periodic Table of the Elements. Particularly suitable metals are Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pal, Os, Ir, Pt and the lanthanide metals Ce, Pr, Nd, Pm, Sm, Eu, Gd, Tb, Dy, HO, Er, Tm, Yb and Lu. A reflective layer of aluminium or gold is especially preferred on account of the high reflectivity and the ease with which it can be prepared.

The topmost layer, depending on the layer structure, for example the reflective layer, the dithioquinacridone layer or a further auxiliary layer (conveniently of a solid organic compound), may be coated with a protective layer that may have a thickness of 0.1 to 100 μm, preferably 0.1 to 50 μm and, most preferably, 0.5 to 15 μm. Mainly suitable for use as protective material are plastics materials that are coated in a thin layer, either direct or with the aid of adhesive layers, on to the substrate or the topmost layer. It is expedient to choose mechanically and thermally stable plastics materials which have good surface properties and may be additionally modified, for example marked. The plastics materials may be thermoset and thermoplastic materials. Radiation-cured (e.g. UV cured) protective layers which are particularly easy and economical to prepare are preferred. A host of radiation-curable materials are known. Exemplary of radiation-curable monomers and oligomers are acrylates and methacrylates of diols, triols and tetrols, polyimides from aromatic tetracarboxylic acids and aromatic diamines containing $C_1$–$C_4$alkyl groups in at least two ortho-positions of the amino groups, and oligomers containing dialkyl groups, conveniently dimethylmaleimidyl groups. Specific examples are UV-crosslinkable polymers derived from polyacrylates, such as RENGOLUX® RZ 3200/003 or 3203/001, available from Morton International-Dr. Renger, and SD-17 sold by the Dainippon Ink Company.

The layer may be a pure layer of the solid organic compound or consist of a solid mixture of the pigment with the compound or of a homogeneous mixture of the solid compound with a transparent binder, typically a plastics material. The thickness of a layer of pure solid organic compound in the form of a vapour deposited film may be from 30 to 2000 Å, preferably 50 to 1000 Å and, most preferably, 100 to 500 Å. The thickness of the layer of vapour deposited mixture of pigment/solid organic compound may be typically 50 to 6000 Å, preferably 100 to 3000 Å and, most preferably, 200 to 1500 Å. The thickness of the layer of the mixture of organic compound and binder (applied conveniently with a coating apparatus) may be typically 0.1 to 100 μm, preferably 0.5 to 50 μm and, most preferably, 0.5 to 5 μm. The mixture with the binder can contain 0.1 to 95%, preferably 1 to 80% by weight and, most preferably, 1 to 60% by weight, of a solid organic compound, based on the total amount of binder and compound. Transparent binders may suitably be the plastics materials mentioned above in connection with the substrate. Particularly preferred binders are polyolefins, polycarbonates as well as polymethacrylates such as polymethylmethacrylate, thermosetting polyesters and epoxy resins. The mixture may also be the substrate itself, typically a polycarbonate into which the solid organic compound has been blended.

The recording materials used in the practice of this invention can be prepared by methods which are known per se. Depending on the materials used and their mode of use, different coating techniques can be applied.

Suitable coating techniques include immersion, casting, brushing, doctor coating, centrifugal casting, and vapour deposition methods which are carried out under vacuum. If, for example, casting methods are employed, solutions in organic solvents will normally be used, which solutions may additionally contain a binder if a solid organic compound is used. When using solvents, care must be taken that the substrates are inactive to these solvents. It is preferred to prepare all layers by vapour deposition, especially under vacuum. Suitable coating techniques are described, inter alia, in EP-A-0 401 791. The pigment layer or layers and the layer or layers of a solid organic compound can be vapour deposited successively or simultaneously.

The recording layer or layers and the metallic reflective layers are preferably applied by vapour deposition under vacuum. The material to be applied is fast put into a suitable vessel, which may be equipped with a resistance heating, and placed into a vacuum chamber. The substrate on to which the material is to be deposited is clamped above the vessel with the material to be vapourised. The clamp is constructed such that the substrate can be rotated (e.g. at 10 rpm) and heated. The vacuum chamber is evacuated to about $1.3 \cdot 10^{-5}$ to $1.3 \cdot 10^{-6}$ mbar ($10^{-5}$ to $10^{-5}$ to $10^{-6}$ torr), and the heating is adjusted such that the temperature of the material to be deposited rises to its vapourising temperature. The deposition is continued until the layer applied has the desired thickness. Depending on the system, fast the recording material and then the reflective layer is applied, or conversely. The application of a reflective layer can in some cases be dispensed with. This method of vapour deposition is especially suitable for the simultaneous application of the above mentioned pigments (e.g. DTPP or dithioquinacridones) and solid organic compounds (e.g. hydrazones or DBS) to form homogeneous mixed layers.

It is particularly preferred to apply the metallic reflective layer by the sputtering technique on account of the good bonding to the substrate. The material to be applied (e.g. aluminium) in the form of a plate is used as a "target" electrode, whereas the substrate is mounted on the counter-electrode. First the vacuum chamber is evacuated to about $10^{-6}$ torr and then inert gas, e.g. argon, is introduced until the pressure is about $10^{-3}$ torr. Between the target electrode and the counter-electrode a high direct current voltage or radio-frequency voltage of several kV is applied, optionally using permanent magnets (magnetron sputtering) so as to produce $Ar^+$ plasma. The metal particles sputtered by the $Ar^+$ ions of the target electrode are uniformly and firmly deposited on the substrate. Coating is effected within a few to several minutes, depending on the target materials, sputtering technique and sputtering conditions. This sputtering technique is described in detail in the technical literature (e.g. W. Kern and L. Vossen, "Thin Film Processes", Academic Press, 1978).

The thickness of the layer formed by vapour deposition can be monitored with the aid of an optical system which measures the reflectivity of the reflective surface coated with the absorption material. The growth of the layer thickness will preferably be monitored with a quartz resonator.

The preparation of the pigment phase exhibiting an absorption band in the NIR range is effected by per se known methods. Thus the pigment layers can be treated with solvent vapours as described, inter alia, in U.S. Pat. No. 4,760,151 for pyrrolopyrroles, U.S. Pat. No. 4,760,004 for quinacridones and by K. Arishima et al., Appl. Phys. Letters 40 (3), p. 279 (1982) for phthalocyanines. Suitable solvents are typically acetone, tetrahydrofuran, methanol, acetonitrile, 1-acetoxy-2-ethoxyethane, dimethyl sulfoxide, ethyl acetate or methyl isobutyl ketone. Methyl isobutyl ketone is preferred.

The requisite absorption band in the NIR range can also be produced direct during the formation of the reflective layer using the vacuum technique by the action of heat.

Protective layers are preferably applied by spin coating and crosslinked with UV light when using light-sensitive materials.

The material eligible for use in the practice of this invention is pre-eminently suitable for writing information by irradiation with laser light in the NIR range. After irradiation a markedly reduced absorption is observed. The change in reflection or transmission can therefore be used for reading out information without the stored information being destroyed by the laser light used for reading out. The information can therefore be read out repeatedly.

The structure of the recording material of this invention will depend mainly on the method of reading out: known techniques are measuring the change in transmission or reflection. If the recording system functions according to a change in light transmission, the structure may suitably comprise: transparent substrate/recording layer (one or more layers) and, if appropriate, transparent protective layer. The radiation for writing and reading out information can be applied either from the substrate side of the system or from the recording layer or protective layer side, the light detector always being on the adjacent side.

If the recording process functions according to a change in reflectivity, then other layered structures are possible for the substrate: transparent substrate/recording layer (one or more layers)/reflective layer/if appropriate, protective layer (not necessarily transparent), or substrate (not necessarily transparent)/reflective layer/recording layer and, if appropriate, transparent protective layer. In the former case, the radiation is applied from the substrate side of the system, whereas in the latter case the radiation is applied from the recording layer or, if present, from the protective layer side of the system. In both cases, the light detector is on the same side as the light source. The first mentioned layer structure of the inventive recording material is generally preferred.

In the practice of this invention, the recording layer in the above structures will be understood as meaning a combination of pigment and solid organic compound.

Suitable lasers include commercial diode lasers, preferably semiconductor diode lasers, for example GaAsAl, InGaAlP or GaAs lasers with a wavelength of 780, 650 and 830 nm respectively. The information can be written point by point or linearly using a light modulator.

The energy of the laser light used for recording may be typically from 0.1 to 10 nJ/marking (bit), preferably from 0.2 to 5 nJ/marking (bit) and, most preferably, 0.8 to 3 nJ/marking (bit). The amount of energy is essentially controlled by the irradiation time, for example by pulses in the range from a few microseconds, typically 10 to 100 nanoseconds.

The process of this invention makes it possible to store information with a high degree of reliability and durability, the information being distinguished by very good mechanical and thermal stability as well as by superior light stability and clear edge definition. A particular advantage is the surprisingly high signal-to-noise ratio of carrier material to information marking, which permits the information to be read out easily. In addition, the optical recording system is simple and inexpensive. Furthermore, no toxic materials such as selenium are used in the system.

The information is read out by measuring the absorption by the reflection or transmission method using laser light It is particularly advantageous that laser light of the wavelength used for recording can be utilised, i.e. a second laser also need not be used. In a preferred embodiment of the process, information is written and read out at the same wavelength. The information is normally read out by using low-energy lasers whose radiation intensity is ten- to fifty-fold lower than the laser light used for recording. The information can be read out once or repeatedly. The shift in the absorption spectrum and/or the stored information can be read out with a photodetector using a low-energy laser. Suitable photodetectors comprise PIN photodiodes which make it possible to measure the spectral changes by transmission or absorption and, in particular, reflection.

A high storage density can be achieved with the process of the invention. Possible utilities of the invention include storage materials for computers or ID and security cards.

The recording material of the invention may have the following structure:

(a) transparent substrate, (b) recording layer, and (c) transparent protective layer, or (a) transparent substrate, (b) recording layer, (c) reflective layer, and (d) protective layer, or (a) substrate, (b) reflective layer, (c) recording layer, and (d) transparent protective layer.

In a preferred embodiment of the invention, the recording layer comprises at least one layer of a dithiopyrrolopyrrole and at least one layer of dibenzyl sulfoxide or an organic hydrazone, or at last one layer in the form of a homogeneous mixture of a dithiopyrrolopyrrole and dibenzyl sulfoxide or of an organic hydrazone.

In another preferred embodiment of the invention, the recording layer comprises at least one layer of a dithioquinacridone and at least one layer of an organic hydrazone, or at least one layer in the form of a homogeneous mixture of a dithioquinacridone and an organic hydrazone.

The material may be so composed that a layer of a solid organic compound, with or without a transparent binder, is provided between the recording material and the substrate or is present on the recording material.

The recording material may be a homogeneous mixture of a pigment and a solid organic compound. Preferably the pigment is a dithiopyrrolopyrrole or a dithioquinacridone and the solid compound is an organic hydrazone. The topmost layer of the material may be coated with a reflective layer which may itself be coated with a protective layer.

The invention is illustrated in more detail by the following Examples.

EXAMPLE 1

1,4-Dithioketo-3,6-diphenylpyrrolo[3,4-c]pyrrole (DTPP), the hydrazone $(C_2H_5)_2N$-$C_6H_4$-p-CH=N-$N(C_6H_5)_2$ and DTPP are vapourised under a high vacuum in layer thicknesses of c. 150 Å, 150 Å and 450 Å, respectively, on to a polycarbonate substrate (thickness 1.2 mm). The vapour deposition causews the DTPP to form in a crystal modification having an absorption in the NIR range. Then a reflective layer of aluminium having a thickness of c. 1000 Å is deposited by high vacuum vapour deposition on to the layer of DTPP. Afterwards a UV crosslinkable photopolymer (RENGOLUX® RZ 3203/001) is applied in a thickness of c. 8 μm and crosslinked with UV light. Electronic information is written with a GaAsAl diode laser (Toshiba) of 780 nm (9 mW) while the substrate rotates at a linear velocity of 1.4 ms$^{-1}$. The reflectivity measured through the substrate before and after writing at the same wavelength of 780 nm is 25% and 65% respectively.

EXAMPLE 2

The procedure of Example 1 is repeated, but replacing DTPP with unsubstituted dithioquinacridone of formula II and using a glass substrate instead of polycarbonate. The layer thicknesses are c. 150 Å, 200 Å and 650 Å, respectively. This layer is then exposed to the vapours of methyl isobutyl ketone for 30 minutes in order to effect a shift to a phase having NIR absorption. A reflective layer of aluminium as well as a protective layer are applied as in Example 1. Electronic information is written with a GaAsAl diode laser (Toshiba) of 780 nm (9 mW) while the substrate rotates at a linear velocity of 1.4 ms$^{-1}$. The reflectivity measured through the substrate before and after writing at the same wavelength of 780 nm is 20% and 38%, respectively.

EXAMPLE 3

The procedure of Example 1 is repeated, but using dibenzyl sulfoxide instead of the hydrazone $(C_2H_5)_2N$-$C_6H_4$-p-CH=N-$N(C_6H_5)$. The layer thicknesses am c. 200 Å, 200 Å and 600 Å, respectively. The reflectivity measured before writing is 10% and after writing 58%.

EXAMPLE 4

1,4-Diketo-3,6-diphenylpyrrolo[3,4-c]pyrrole is vapour deposited in a layer thickness of of 200 Å onto a polyolefin substrate (Zeonex®, supplied by Nippon ZEON). Then DTPP is deposited in a layer thickness of 600 Å, followed by the vapour deposition of a 900 Å layer of aluminium. The aluminium layer is coated in a coating apparatus with a UV-crosslinked layer of a photopolymer (SD-17, supplied by Dainippon Inc.). Information bits are written by a diode laser at 780 nm and at a constant angular velocity of 1250 rpm. The reflectivity measured before writing is 16% and after writing 33%.

EXAMPLE 5

The procedure of Example 4 is repeated, but depositing 1,4-diketo-3,6-bis(4'-pyridyl)pyrrolo[3,4-c]pyrrole instead of DPP 3067 in a layer thickness of 300 Å. The reflectivity measured before writing is 15% and after writing 30%.

EXAMPLE 6

The procedure of Example 4 is repeated, but replacing 1,4-diketo-3,6-diphenylpyrrolo[3,4-c]pyrrole with 1,4-diketo-3-(4'-chlorophenyl)-6-pyridylpyrrolo[3,4-c]pyrrole. The reflectivity measured before writing is 15% and after writing 35%.

EXAMPLE 7

The procedure of Example 4 is repeated, but depositing quinacridone instead of 1,4-diketo-3,6-diphenylpyrrolo[3,4-c]pyrrole in a layer thickness of 300 Å. The layer thickness of DTPP is 700 Å. The reflectivity measured before writing is 17% and after writing 40%.

What is claimed is:

1. A material on which information is written, comprising a substrate coated with at least one recording layer of a pigment selected from the group consisting of a dithioxopyrrolopyrrole, a dithioquinacridone, a phthalocyanine and mixtures thereof, which pigment exhibits an absorption band in the near infrared range and is in contact with a solid organic compound that changes a crystal modification of the pigment upon irradiation with laser light and even before and after irradiation exhibits no absorption in the near infrared range, and said recording layer containing the written information in the form of bits which, compared with an unirradiated environment, have a greater reflectivity and reduced absorption in the near infrared range.

2. A material according to claim 1, which has a structure comprising (a) transparent substrate, (b) recording layer and (c) transparent protective layer.

3. A material according to claim 1, which has a structure comprising (a) transparent substrate, (b) recording layer, (c) reflective layer and (d) protective layer.

4. A material according to claim 1, which has a structure comprising (a) substrate, (b) reflective layer, (c) recording layer and (d) transparent protective layer.

5. A material according to claim 1, wherein said substrate is transparent and dielectric.

6. A material according to claim 5, wherein a layer of a solid organic compound, without or together with a transparent binder, is provided between the recording layer and the substrate or on the recording layer.

7. A material according to claim 5, wherein the recording material is a homogeneous mixture of a pigment and a solid organic compound.

8. A material according to claim 5, wherein a topmost layer is coated with a reflective layer which may be coated with a protective layer.

9. A material according to claim 11, wherein the recording layer consists of at least one layer of a dithioxopyrrolopyrrole and at least one layer of dibenzyl sulfoxide or of an organic hydrazone, or of at least one layer in the form of a homogeneous mixture of a dithioxopyrrolopyrrole and dibenzyl sulfoxide or of an organic hydrazone.

10. A material according to claim 2, wherein the recording layer consists of at least one layer of a dithioxopyrrolopyrrole and at least one layer of dibenzyl sulfoxide or of an organic hydrazone, or of at least one layer in the form of a homogeneous mixture of a dithioxopyrrolopyrrole and dibenzyl sulfoxide or of an organic hydrazone.

11. A material according to claim 3, wherein the recording layer consists of at least one layer of a dithioxopyrrolopyrrole and at least one layer of dibenzyl sulfoxide or of an organic hydrazone, or of at least one layer in the form of a homogeneous mixture of a dithioxopyrrolopyrrole and dibenzyl sulfoxide or of an organic hydrazone.

12. A material according to claim 4, wherein the recording layer consists of at least one layer of a dithioxopyrrolopyrrole and at least one layer of dibenzyl sulfoxide or of an organic hydrazone, or of at least one layer in the form of a homogeneous mixture of a dithioxopyrrolopyrrole and dibenzyl sulfoxide or of an organic hydrazone.

13. A material according to claim 1, wherein the recording layer consists of at least one layer of a dithioquinacridone and at least one layer of an organic hydrazone, or of at least one layer in the form of a homogeneous mixture of a dithioquinacridone and of an organic hydrazone.

14. A material according to claim 2, wherein the recording layer consists of at least one layer of a dithioquinacridone and at least one layer of an organic hydrazone, or of at least one layer in the form of a homogeneous mixture of a dithioquinacridone and of an organic hydrazone.

15. A material according to claim 3, wherein the recording layer consists of at least one layer of a dithioquinacridone and at least one layer of an organic hydrazone, or of at least one layer in the form of a homogeneous mixture of a dithioquinacridone and of an organic hydrazone.

16. A material according to claim 4, wherein the recording layer consists of at least one layer of a dithioquinacridone and at least one layer of an organic hydrazone, or of at least one layer in the form of a homogeneous mixture of a dithioquinacridone and of an organic hydrazone.

17. A material according to claim 6, wherein the pigment is a dithioxopyrrolopyrrole or a dithioquinacridone, and the solid organic compound is an organic hydrazone.

18. A material according to claim 7, wherein the pigment is a dithioxopyrrolopyrrole or a dithioquinacridone, and the solid organic compound is an organic hydrazone.

* * * * *